(No Model.) 3 Sheets—Sheet 1.
J. F. KELLER.
SEEDING BOOT AND ATTACHMENTS.
No. 372,755. Patented Nov. 8, 1887.
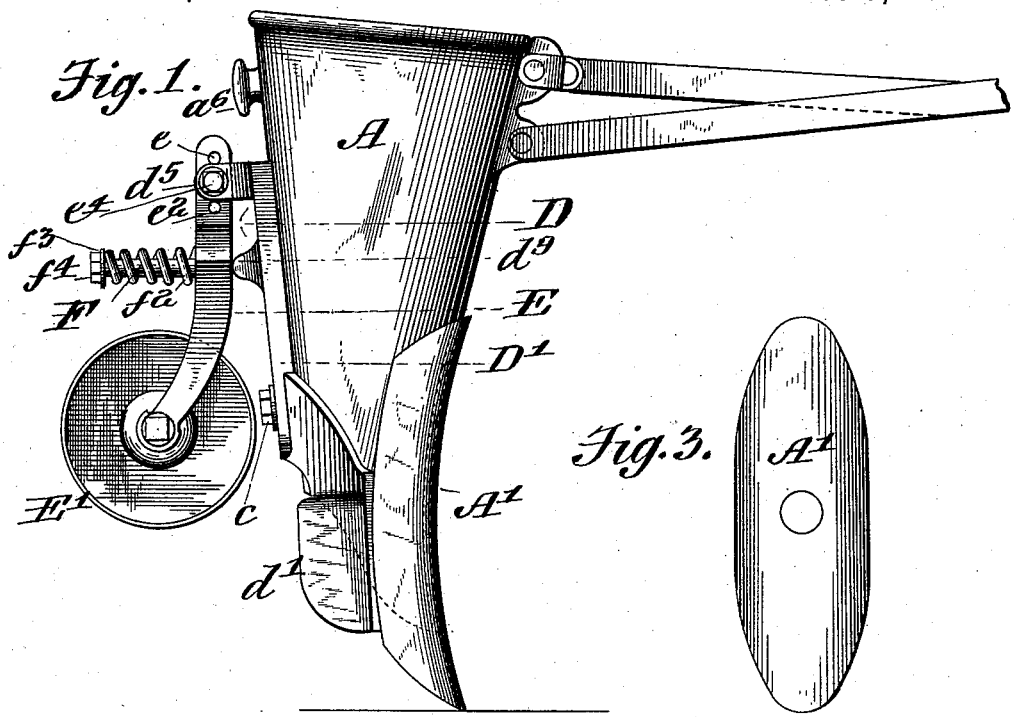
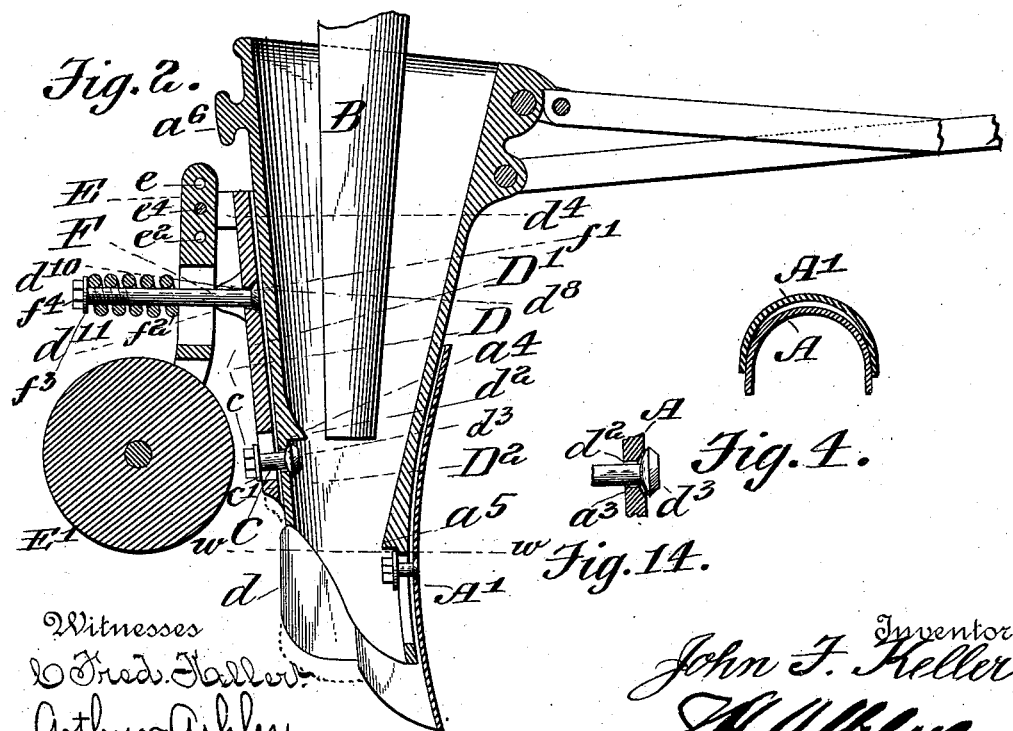
Witnesses
Fred. Hallov
Arthur Ashley
Inventor
John F. Keller
By [Attorney signature]

(No Model.) 3 Sheets—Sheet 2.

J. F. KELLER.
SEEDING BOOT AND ATTACHMENTS.

No. 372,755. Patented Nov. 8, 1887.

WITNESSES:
Fred Keller
Arthur Ashley

INVENTOR
John F. Keller
By Ashley atty.
ATTORNEY (No Model.)
J. F. KELLER.
SEEDING BOOT AND ATTACHMENTS.
No. 372,755. Patented Nov. 8, 1887.
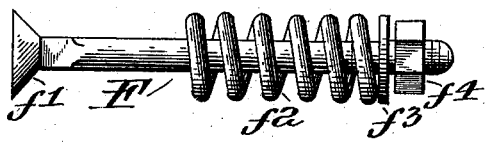
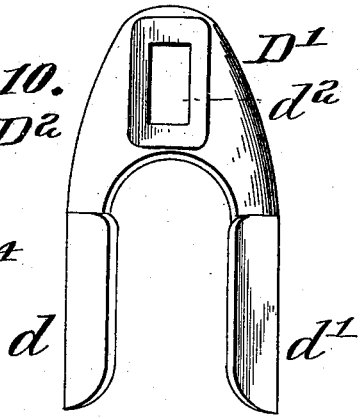
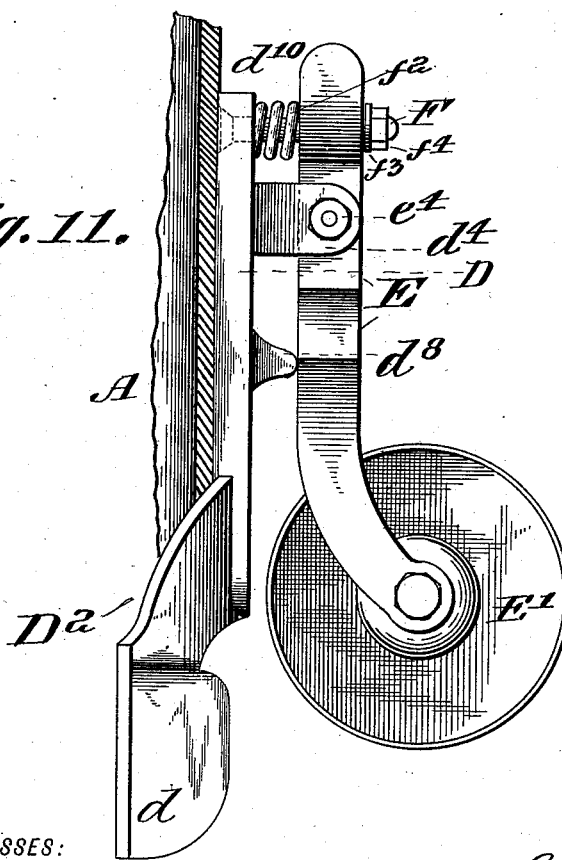
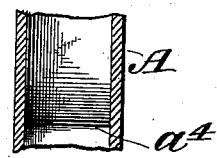
WITNESSES:
INVENTOR
John F. Keller

UNITED STATES PATENT OFFICE.

JOHN F. KELLER, OF SHEPHERDSTOWN, WEST VIRGINIA.

SEEDING-BOOT AND ATTACHMENTS.

SPECIFICATION forming part of Letters Patent No. 372,755, dated November 8, 1887.

Application filed June 14, 1887. Serial No. 241,265. (No model.)

*To all whom it may concern:*

Be it known that I, JOHN F. KELLER, a citizen of the United States, residing at Shepherdstown, in the county of Jefferson, in the State of West Virginia, have invented new and useful Improvements in Seeding-Boots and Attachments therefor, of which the following is a description.

The invention relates, particularly, to seeding-boots of that class which are commonly employed in connection with the drag-bars of grain-drills; but it is applicable also in seeding-boots in whatever connection they may be employed.

The invention consists, in part, in certain novel features and combinations in a seeding-boot, whereby grains or other substances which are precipitated through such boot are deflected from one side to the other of its interior surface, and are thus caused to be widely separated and evenly distributed throughout the area of the boot-furrow as the seeding-machine advances across the field.

The invention consists, also, in a novel adjustable attachment applied upon the rear lower portion of the seeding-boot, whereby clods of turf, roots, grass, or other coarse substances are prevented from falling inwardly and covering the grain as it is deposited in the furrow, to the exclusion of the finer and more suitable portions of the soil, and whereby the admission of a suitable supply of such finer portions of the soil at the rear of the boot and upon the grain or other substance therein is rendered certain.

The invention consists, also, in the provision, in connection with a seeding-boot, of a novel covering-roller, whereby collections of roots, turf, or other substances which would otherwise clog such roller and impede its rolling and crushing movements, are permitted to pass to the rear.

The invention consists, also, in certain novel elements and combinations of elements in and in connection with a seeding-boot, whereby the same is rendered more effective and certain in its operation, as will first be particularly described, and then distinctly pointed out in the claims.

Figure 5:
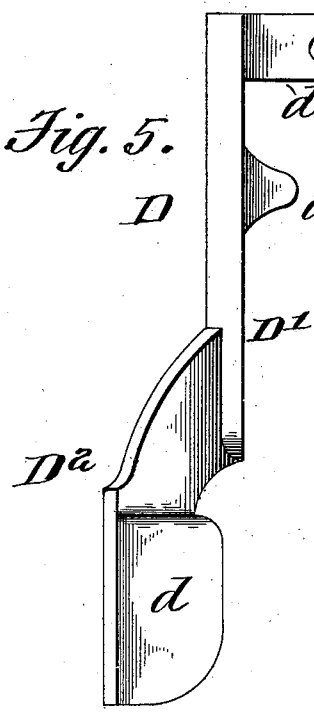
Figure 6:
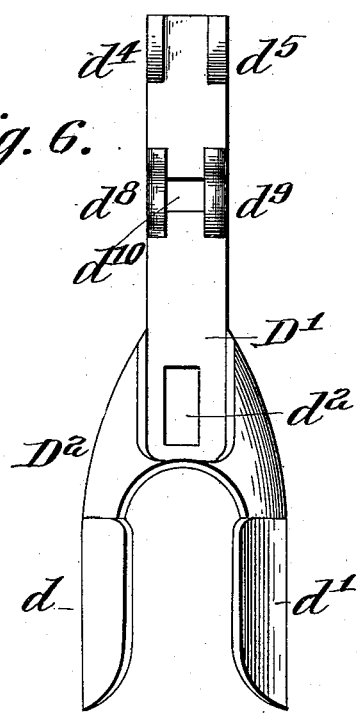
Figure 7:
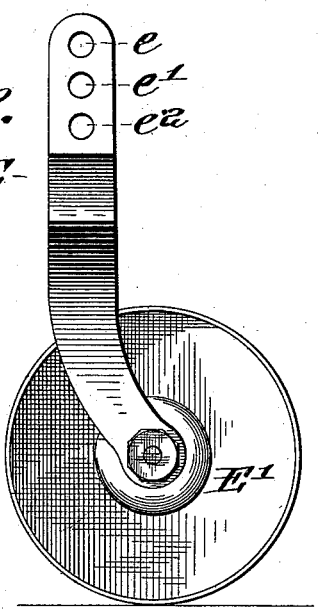
Figure 8:

In the drawings, Figure 1 represents a side elevation of a portion of the drag-bars of a grain-drill having my improved seeding-boot and its attachments connected thereto. Fig. 2 is a vertical central section from front to rear of the seeding-boot and its attachments. Fig. 3 is a front elevation of the tooth or hoe of the seeding-boot. Fig. 4 is a horizontal section of the seeding-boot on the line $w\ w$ of Fig. 2. Fig. 5 is a side elevation of the adjustable excluding guard or shield and regulator detached. Fig. 6 is a rear elevation of the adjustable excluding guard or shield and regulator. Fig. 7 is a side elevation of the adjustable stirrup-like roller-support. Fig. 8 is a rear elevation of the adjustable stirrup-like roller-support. Fig. 9 is a side elevation of the holding-bolt or spring-bolt. Fig. 10 is a rear elevation of a modified form of the excluding guard or shield and regulator. Fig. 11 is a detail elevation representing a modification of the construction shown in Figs. 1 and 2, the spring being changed in its location. Figs. 12 and 13 are details, the relation of which will be understood from the reference-letters thereon. Fig. 14 is a detail, enlarged, of the securing-bolt represented in Fig. 2.

The seeding-boot A is, as best seen in Fig. 2, provided upon its rear inner surface with an overhanging deflector or spreader, $a^4$. This projection is formed with the boot, and extends, as seen in Fig. 12, in a horizontal line across a portion of such inner surface, its function being, primarily, to deflect the granular matter as it falls upon its inclined upper surface and cause it in part to pass obliquely downward and impinge upon the opposite surface and upon the front shoulder or deflecting-projection, $a^5$, whence, in a widely-scattered condition, it is precipitated into the furrow. An additional office is performed by this deflector in preventing contact of the seed-tube B with the head of the securing-bolt C, to the serious injury of such tube.

The slidable guard or shield and regulator D, the lower portion, $D^2$, of which is bifurcated, as shown, to form the wings $d$ and $d'$, is provided in its body portion $D'$ with a slot, $d^2$, to receive a holding-bolt or securing-bolt, C, which in turn receives a nut, $c$, whereby the guard is made fast to the boot, the bolt extending through the orifice $d^2$, at the inner end of which is an oblong recess or countersink, $a^3$, to receive the correspondingly-shaped head $d^3$ of such bolt.

It will be noted that the lower extremity of the wings $d$ and $d'$ of the guard or shield D terminates at a point some distance above the lower extremity of the drill-tooth A', and that the dimensions of the lateral openings below such wings may be varied by adjustment of such guard up or down by movement of the securing-bolt C in its slot $d^2$.

In the use of seeding-boots as ordinarily constructed it has been found that in many situations and under various conditions—as in newly-cleared ground or in a long-neglected field—clods of roots, turf, weeds, coarse grass, and the like coming in contact with the drill-tooth are slightly turned aside as the drill advances, only to fall into the furrow and upon the grain in the same, to the exclusion of the finer and more suitable portions of the soil. Under a coarse covering such as described many of the grains do not germinate, or, if they germinate, they make but a feeble growth and eventually perish prematurely and without becoming productive through lack of nutriment.

Through the provision of the guard, as described, accumulations of coarse material are, so to speak, held away from the side of the furrow until the seed deposited therein has been suitably covered by the fine soil which falls into the furrow through the openings in the angle behind the tooth and below the extremity of the wings of the guard. If the seeds be first properly bedded, in connection with a suitable supply of fertilizing material, comparatively slight injury, if any, will result, even if the coarse materials subsequently fall upon the furrow. In this connection it will be noted that the rear edges of the broad drill-tooth A' project outward laterally a short distance farther than the wings $d$ $d'$, and thus serve as a guard to prevent roots or other materials from becoming lodged upon the edges of such wings in the narrow space between the drill-tooth and the guard.

Upon the rear face of the upper portion of the guard D are the two rearwardly-extending parallel arms $d^4$ $d^5$, between which is received the stirrup-like roller-support E. The upper extremity of this roller-support is provided with a series of transverse perforations, $e$ $e'$ $e^2$, either of which may receive the suspending-bolt $e^4$, which has its bearings in perforations $d^6$ $d^7$ in the arms $d^4$ $d^5$ of the guard. By this means the roller E' may be changed in its vertical adjustment as the conditions of the soil or other circumstances may require.

Below the arms $d^4$ $d^5$ are the stops $d^8$ $d^9$, arranged side by side, as shown, and with a suitable interval between them for the accommodation of the spring-bolt F. The bolt F extends through a perforation, $d^{10}$, in the body of the guard, and its head $f'$ is received in a recess, $d^{11}$, in such body. The outer portion of the bolt is encircled by the coiled spring $f^2$, secured by means of disk $f^3$ and nut $f^4$.

It should be observed that the pressure of the spring is not so great as to prevent free movement in a vertical plane of the main body of this bolt, the effect of the spring being to so secure the parts as to enable the bolt to be moved up or down as if pivoted at its inner extremity.

It will of course be understood that the stops $d^8$ $d^9$ restrict the forward movement of the roller-support and its roller, while under all conditions maintaining between the roller and the point of the securing-bolt C a sufficient space to permit the insertion of the nut $c$ and its washer $c'$ upon the same.

It will be perceived that through the provision of the pivotal support and the spring, as described, the roller is rendered flexible and, as it were, automatic in its action, so that if it encounter an obstruction it will not throw out the drill-tooth, as in many cases it would do if it were rigidly attached. Another important advantage arising from this construction is the exemption from liability to fracture of the parts through the shock of the sudden jerk which ensues upon contact of the tooth with any fixed obstruction.

It will also be noted that the upper extremity of the shank of the stirrup-like support of the roller does not extend above the level of the lifting-lug $a^6$ upon the rear of the boot A, and that consequently such shank cannot, when the boot is suddenly tilted by striking a fixed obstruction, be brought into contact with the seed-tube carriers, to the serious injury or perhaps entire destruction of the same.

The guard and regulator represented in Fig. 10 is designed for use under conditions in which the use of a covering-roller is impracticable or undesirable. The contact-surface of the body portion D' is, as will be seen, adapted to embrace the corresponding portion of the boot; but the curvature of its recess is preferably of a slightly smaller comparative radius than that of the boot, so that the edges of the body embrace the sides of the boot, while the inner portion of the recess is still at a little distance from the central rear portion of the boot. Under this construction, as will be apparent, as the securing-nut $c$ is tightened the body of the regulator or guard is held in position by a spring action.

Either of the two forms of guard represented may, as is obvious, be readily applied to seeding-boots of any ordinary construction.

The drill-tooth may be and by preference will be so constructed as to engage by its edges the body of the boot, the two being slightly separated at the center, as in the guard above described.

The roller being, when in its ordinary working position, but a few inches behind the opening or heel of the boot, the interval between them is so small that sufficient space is not afforded for the admission of lumps of earth, clods of turf, or collections of roots of considerable size, all such accumulations being thrown laterally outward, first by the boot and the guard attached thereto, and again by contact with the sides of the roller itself.

It is apparent that the body portion D', to which the shank of the roller-support is attached, might be formed without the wings $d$ and $d'$, if desired.

Having described my invention, I claim—

1. A seeding-boot which upon its rear inner surface is provided with a projecting seed deflector or spreader and tube-protector, as described.

2. A seeding-boot which is provided upon its rear and upon its front inner surface with an overhanging deflector or spreader and seed-tube protector, the front deflector being in a lower plane than the rear deflector, whereby portions of the granular material are deflected first from rear to front, and then from front to rear, and are thus widely scattered, substantially as specified.

3. A seeding-boot which upon the sides of its discharge-opening is provided with a vertically-adjustable guard and regulator, whereby coarse substances are turned aside from the furrow, and whereby a graduatable opening is provided below the lower extremity of such guard at each side of the boot, through which the finer portions of the soil are permitted to fall inwardly upon the granular material as it is deposited in the tooth-furrow.

4. The combination, with a seeding-boot, of an adjustable guard and regulator, which is applied upon the lower rear portion of the boot, such guard and regulator being so arranged that a lateral opening is afforded behind the rear edges of the drill-tooth at each side and near the point thereof and directly below the lower extremity of the guard and regulator, substantially as described, and for the purposes set forth.

5. In combination with a seeding-boot, the described guard and regulator, consisting of a central upper portion, which is perforated for vertically-adjustable attachment to the boot, and lower side portions, which constitute rearward continuations above the lower extremity of the tooth thereof, and adapted to graduate the dimensions of the lateral openings of the same, substantially as and for the purposes specified.

6. The combination, with a seeding-boot, of the described bifurcated guard and regulator, consisting of body portion D', having slot $d^2$, and lower portion, $D^2$, divided to form rearwardly-extending wings $d$ and $d'$, substantially as shown and described.

7. The combination, with a seeding-boot, of a vertically-adjustable guard and a pivotally-attached crushing and covering roller, the roller being mounted upon the guard and adjustable therewith, substantially as described.

8. The combination, with a seeding-boot, of a vertically-adjustable guard mounted upon the rear portion of the boot, and a pivotally-attached spring-actuated crushing-roller, the roller and its spring being mounted upon the guard and adjustable therewith in relation to the seeding-boot and its tooth.

9. The combination, with a seeding-boot, of a pivotally-attached, vertically-adjustable, and yielding crushing-roller, substantially as and for the purposes described.

10. The combination, with a seeding-boot, of a pivotally-attached, vertically-adjustable, spring-actuated crushing-roller.

11. The combination, with a seeding-boot, of a rear guard and regulator and a pivotally-attached and yielding crushing-roller.

12. The combination, with a seeding-boot, of a guard and regulator and a pivotally-attached, vertically-adjustable, and yielding crushing-roller.

13. The combination, with a seeding-boot, of a vertically-adjustable guard and regulator, D, a roller-support pivoted upon the adjustable guard, a roller journaled in the lower portion of the pivoted support, and a spring which engages the body of the support and operates to return the roller to its ordinary position when it has been moved therefrom, substantially as described.

14. The combination, with a seeding-boot, of a guard and regulator which is vertically adjustable upon the seeding-boot and a roller-support which is vertically adjustable upon the adjustable guard.

15. The combination, with the seeding-boot A, of the guard and regulator D, having the wings $d$ and $d'$, and the drill-tooth A', such tooth projecting laterally outward beyond the wings $d$ and $d'$ and serving as a shield therefor, as described.

16. The combination, with the seeding-boot A, of the drill-tooth A', the side edges of the tooth engaging the corresponding portions of the body of the boot, and the central portion of the tooth being separated from the corresponding portion of the body of the boot, as set forth, whereby as the securing-bolt is tightened the tooth is held upon the boot by a spring action, as described.

17. The combination, with the seeding-boot A, of the adjustable guard and regulator D, secured thereto, the engaging face of the guard being recessed, as described, so that along the central portion of the coincident surfaces of the boot and the guard an open space is left between the two parts, whereby the same, when the securing-bolt is tightened, are held together, as by spring action, and whereby abrasion of the guard is confined to the outer edges thereof, substantially as set forth.

JOHN F. KELLER.

Witnesses:
ARTHUR ASHLEY,
OCTAVIUS KNIGHT.